United States Patent [19]

Kondo

[11] Patent Number: 5,444,549
[45] Date of Patent: Aug. 22, 1995

[54] IMAGE REDUCTION WITH CONTROLLED IMAGE THINNING

[75] Inventor: Masaya Kondo, Kawasaki, Japan

[73] Assignee: Canon Kabushiki Kaisha, Tokyo, Japan

[21] Appl. No.: 960,703

[22] Filed: Oct. 14, 1992

[30] Foreign Application Priority Data

Oct. 17, 1991 [JP] Japan ................. 3-269266

[51] Int. Cl.⁶ ............................................. G06F 15/62
[52] U.S. Cl. ................................. 358/444; 358/426; 358/438; 358/500
[58] Field of Search ............. 358/444, 213.26, 213.18, 358/141, 148, 138, 150, 11, 12, 15, 470, 427, 400, 426, 261.1, 488, 500, 474, 438, 486

[56] References Cited

U.S. PATENT DOCUMENTS

| | | | |
|---|---|---|---|
| 3,643,016 | 2/1972 | Dattilo | 358/438 |
| 4,679,090 | 7/1987 | Erhardt | 358/213.26 |
| 5,034,814 | 7/1991 | Watson | 358/141 |
| 5,157,519 | 10/1992 | Jacobs | 358/470 |
| 5,191,438 | 3/1993 | Katsurada et al. | 358/426 |
| 5,276,509 | 1/1994 | Mizuno et al. | 358/500 |

*Primary Examiner*—Paul Ip
*Attorney, Agent, or Firm*—Fitzpatrick, Cella, Harper & Scinto

[57] ABSTRACT

In an image processing apparatus of this invention, change amounts of image data, of reception image data, which correspond to target lines with respect to a previous line are obtained, and line data corresponding to the minimum change amount is preferentially thinned, thereby performing image reduction in the sub-scanning direction.

28 Claims, 2 Drawing Sheets

IMAGE REDUCTION WITH CONTROLLED IMAGE THINNING

BACKGROUND OF THE INVENTION

The present invention relates to an image processing apparatus for reducing an image and outputting the reduced image.

Conventionally an image processing apparatus which controls image recording on a recording paper of a predetermined size is known. For example, in an image processing apparatus for printing out a reception image on a roll of recording paper, and cutting the recording paper in a predetermined size after one-page image data is recorded/output, when image reduction is performed in the sub-scanning direction, thinning of one-line data is performed at predetermined intervals.

In the conventional image processing apparatus, however, since reduction in the sub-scanning direction is performed by thinning one-line data at predetermined intervals, a great information loss occurs in reception image data after a thinning operation.

SUMMARY OF THE INVENTION

It is an object of the present invention to provide an image processing apparatus which can reduce an information loss in image data even if reduction in the sub-scanning direction is performed by thinning line data constituting an image from image data.

In order to achieve the above object, according to the present invention, there is provided an image processing apparatus comprising means for inputting a reduction ratio of an image, count means for counting the number of lines constituting the image in accordance with the reduction ratio of the image, means for obtaining change amounts of image data corresponding to the lines on the basis of the count value, and means for thinning image data corresponding to a minimum value of the change amounts from the image data for which counting is performed by the count means, wherein the image is reduced in a sub-scanning direction by the thinning operation.

Other features and advantages of the present invention will be apparent from the following description taken in conjunction with the accompanying drawings, in which like reference characters designate the same or similar parts throughout the figures thereof.

DETAILED DESCRIPTION OF THE PREFERRED EMBODIMENT

A preferred embodiment of the present invention will be described with reference to the accompanying drawings.

Figure 1:
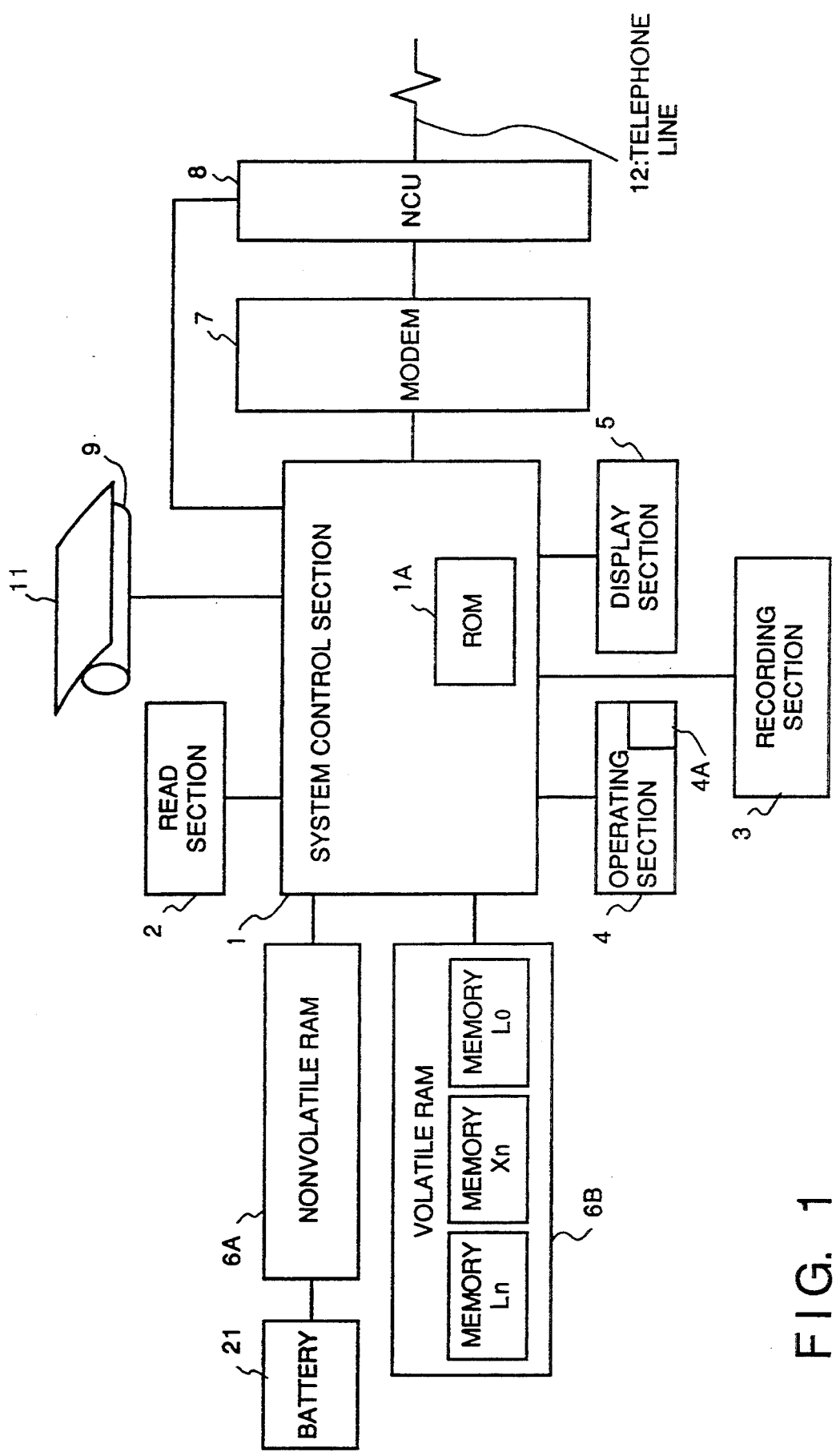
FIG. 1 a block diagram showing the arrangement of a facsimile apparatus according to an embodiment of the present invention.

FIG. 1 is a block diagram showing the arrangement of a facsimile apparatus as an image processing apparatus according to the embodiment of the present invention. Referring to FIG. 1, a system control section 1 is constituted by a microcomputer, a data storage section, and the like, and incorporates a ROM 1A for storing information about a control procedure (to be described later) and control information for counting the amount of change in line data of reception image data.

A read section 2 serves to read a transmission original 11 conveyed by an original convey roller 9. The read section 2 is constituted by, e.g., a CCD image sensor. A recording section 3 records an image corresponding to a received image signal on recording paper by, e.g., thermal transfer.

An operating section 4 is constituted by various operation keys and includes, e.g., a selection switch 4A for designating a reduction recording operation according to the embodiment. A display section 5 displays a processing state of the facsimile apparatus or performs alarm display. Note that the operating section 4 and the display section 5 may be integrated into one operation display section.

A nonvolatile RAM 6A serves to register communication data such as destination telephone numbers. A volatile RAM 6B serves to store reception image data and change amount data with respect to previous line data of reception image data. Note that a volatile memory backed up by a battery 21 may be used as the nonvolatile RAM 6A.

A modem (modulation/demodulation unit) 7 modulates/demodulates a transmission/reception signal. An NCU (network control unit) 8 has a function of transmitting a dial pulse or a multi-frequency signal, as a communication destination selection signal, to a telephone line 12. In addition, the NCU detects a calling signal from the telephone line 12 and performs an automatic reception operation and a line control operation.

A reduction operation of the facsimile apparatus of the embodiment will be described next. Assume that the selection switch 4A of the operating section 4 is a switch for selecting whether to perform image reduction in the sub-scanning direction in an image recording operation of the facsimile apparatus, and that when "reduction" is selected by the switch, an image to be recorded is reduced to 84.5%.

Image reduction at a reduction ratio of 84.5% i.e., a reduction in size to $\frac{7}{8}$, can be performed by thinning one-line data for every eight scanning lines. With regard to a reception image memory, in this embodiment, since image reduction is performed by thinning one-line data for every eight scanning lines, a maximum value m of a line count (the current count value is represented by n) is eight.

A memory Ln (n=1 to m) and a change amount data memory Xn (n=1 to m) are assigned to the volatile RAM 6B. The memory Ln serves to store one-line data of decoded reception image data. The memory Xn serves to store a change amount in units of lines. The change amount is data quantitatively indicating the change ratio of reception image data to previous line data. More specifically, when reception image data is MR (modified Reed)-coded by using MH (modified Huffman)-coded reception image data of a previous line as reference line data, change amount data represents the amount of change in bit length of the coded data. Therefore, the volatile RAM 6B further includes a memory L0 for storing reference line data. Note that coding, decoding, and counting of the change amount are performed by the system control section 1.

Figure 2:
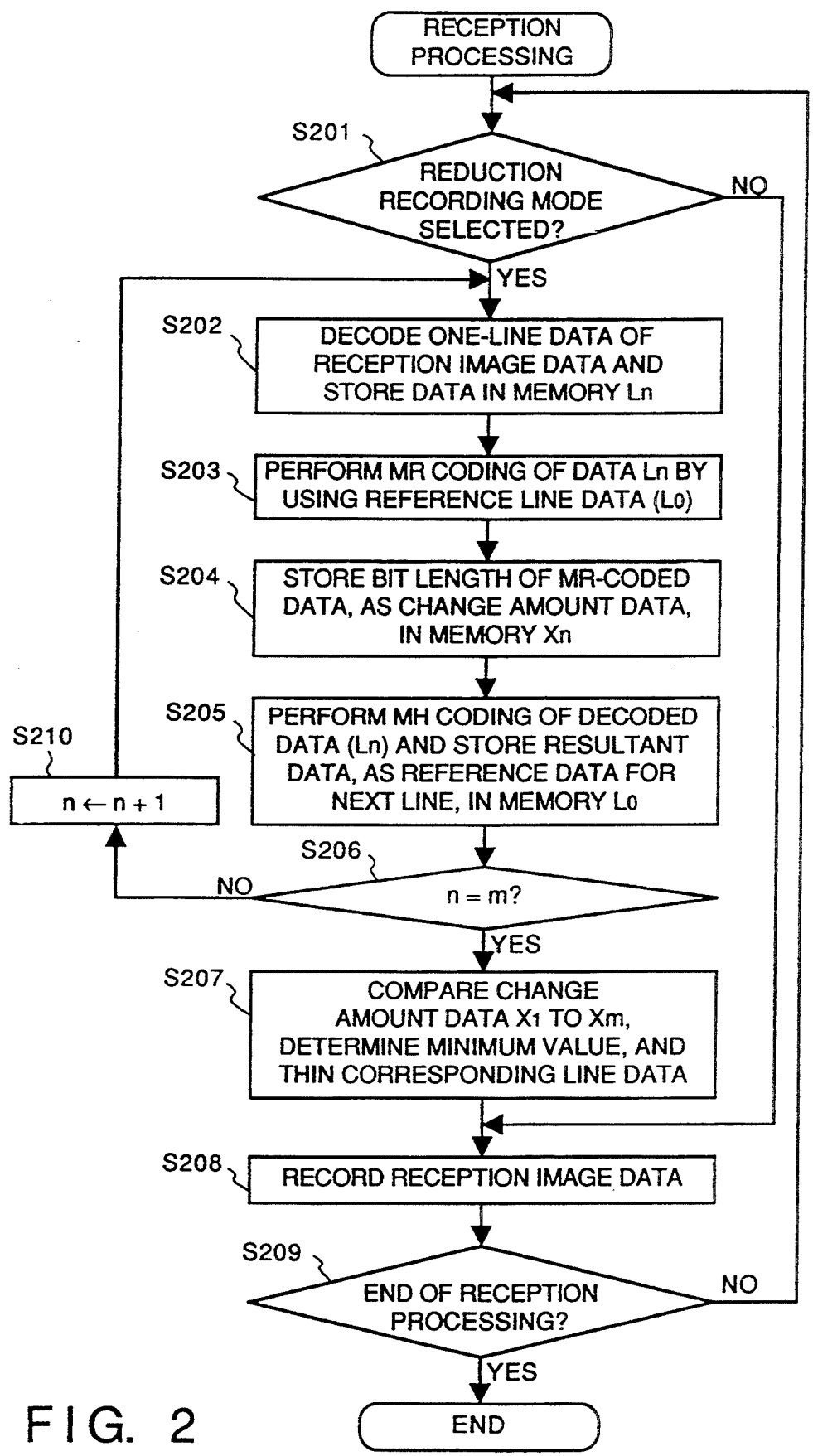
FIG. 2 is a flow chart showing a reduction control procedure in the facsimile apparatus according to the embodiment.

FIG. 2 is a flow chart showing a reduction control procedure in the facsimile apparatus of the embodiment. As shown in FIG. 2, in the facsimile apparatus of the embodiment, when reception processing is started, the selection switch 4A arranged in the operating section 4 is depressed, and it is checked whether the reduction recording mode is selected (step S201). Upon detection of the depressing operation of the selection switch 4A, the reduction recording mode is set. When a reduction recording operation is to be performed, one-line data of reception image data is decoded, and the decoded data is stored in the decoded line data memory Ln in the reception image memory of the volatile RAM 6B (step S202).

The decoded reception image data is then MR-coded by using the reference line data (MH-coded data) in the memory L0 as a reference line (step S203). The bit length of the MR-coded reception image data is stored, as change amount data, in the memory Xn (step S204).

In step S205, the decoded reception image data in the memory Ln is MH-coded, and the MH-coded data is stored, as reference line data for the next data, in the memory L0. It is then checked whether the count value n is equal to the maximum value m (step S206). If the count value is smaller than the maximum value m, the count value E is incremented by one (step S210), and the flow returns to step S202 to process the next reception image data.

If the line count value n is equal to the maximum value m, change amount data Xn (X1 to Xm) stored in the memory Xn in the volatile RAM 6B are compared with each other to select reception image data (Lx in this case) corresponding to the minimum change amount. The reception data Lx corresponding to the minimum change amount is thinned (step S207). Subsequently, the resultant image data is sent, as reduced reception image data, to the recording section 3, thus performing a data recording operation (step S208).

In step S209, it is checked whether the reception processing is completed. If NO in step S209, the flow returns to step S201 to continue the reception processing.

As described above, when a reception image is to be reduced in the sub-scanning direction, the change rates of lines of a number corresponding to a reduction ratio are obtained with respect to a previous line of reception image data, and reception image data corresponding to the minimum change rate is preferentially thinned, thereby minimizing an information loss caused in the reception image data upon thinning.

In the above-described embodiment, the image reduction ratio in the sub-scanning direction is 84.5%. However, the reduction ratio is not limited to this value. In addition, the reduction ratio may not be a fixed magnification but may be arbitrarily changed.

Furthermore, a change amount of reception image data is obtained by using the MR coding scheme, and the change amount is determined by the bit length of MR-coded data. However, the present invention is not limited to these schemes, but other coding schemes may be used.

For example, the present invention can be applied to an apparatus for recording a reception image on a fixed form paper sheet having a predetermined size. The present invention is not limited to a facsimile apparatus as an image processing apparatus but can be applied to any types of apparatuses, e.g., a printer, designed to perform a print out operation in units of lines. In addition, data recording is not limited to an operation of printing out image data on recording paper. For example, the present invention can be applied to image reduction in a display operation of an LCD or the like.

The present invention may be applied not only to a system constituted by a plurality of apparatuses but also to an apparatus constituted by a single unit. In addition, it is apparent that the present invention can be applied to a case wherein the above-described processing can be performed by supplying a program to a system or an apparatus.

As many apparently widely different embodiments of the present invention can be made without departing from the spirit and scope thereof, it is to be understood that the invention is not limited to the specific embodiments thereof except as defined in the appended claims.

What is claimed is:

1. An image processing apparatus comprising:
    means for inputting a reduction ratio of an image;
    count means for counting the number of lines constituting the image in accordance with the reduction ratio of the image;
    means for obtaining change amounts of image data corresponding to the lines on the basis of the count value; and
    means for thinning image data corresponding to a minimum value of the change amounts from the image data for which counting is performed by said count means,
    wherein the image is reduced in a sub-scanning direction by the thinning operation.

2. The apparatus according to claim 1, wherein the change amount is a value based on a change in image data corresponding to a line constituting an image with respect to image data corresponding to a previous line.

3. The apparatus according to claim 2, wherein the change amount is obtained by MR-coding reception image data of a target line by using MH-coded reception image data corresponding to the previous line as a reference line.

4. The apparatus according to claim 3, wherein the change amount is a change in bit length from MH-coded reception image data to MR-coded reception image data.

5. The apparatus according to claim 1, wherein the image data reduced in the sub-scanning direction by the thinning operation is visibly output on recording paper.

6. The apparatus according to claim 1, wherein the image data reduced in the sub-scanning direction by the thinning operation is electrically and visibly output on a display.

7. An image processing apparatus comprising:
    means for inputting image data; and
    processing means for processing to reduce a line of data from among m lines of data constituting the image data,
    wherein said processing means reduces a line of image data which has a minimum value in change amounts with respect to image data corresponding to a previous line out of the m lines of image data.

8. The apparatus according to claim 7, wherein said change amounts indicate a ratio of change to image data of a previous line.

9. The apparatus according to claim 8, wherein said processing means changes the number of lines constituting m lines of image data in accordance with a reduction ratio of an image.

10. An image processing apparatus comprising:
    referring means for referring to m lines of image data in accordance with a reduction ratio of an image;
    detecting means for detecting change amounts of image data to image data of a previous line, with respect to each line of said m lines of image data referred to by said referring means; and thinning means for thinning out image data of a line which is selected, based upon a detection result obtained by said detecting means, from among said m lines of image data referred to by said referring means, wherein said thinning means causes said image to be reduced at said reduction ratio.

11. The apparatus according to claim 10, wherein said change amounts indicate a ratio of change to image data of a previous line.

12. The apparatus according to claim 11, wherein said thinning means thins out image data of a line which provides a minimum value of said change amounts of image data, which is detected by said detecting means, to image data of a previous line.

13. An image processing apparatus comprising:
input means for inputting image data;
detecting means for detecting change amounts of image data to image data of a previous line, with respect to m lines of image data inputted by said input means; and
thinning means for thinning out image data of a line which is selected, based upon a detection result obtained by said detecting means, from among said m lines of image data inputted by said input means.

14. The apparatus according to claim 13, wherein said change amounts indicate a ratio of change to image data of a previous line.

15. The apparatus according to claim 14, wherein said thinning means thins out image data of a line which provides a minimum value of said change amounts of image data, which is detected by said detecting means, to image data of a previous line.

16. An image processing apparatus comprising:
input means for inputting image data;
detecting means for detecting change amounts of image data to image data of a previous line, with respect to m lines of image data input by said input means; and
output means for outputting n lines of image data based upon a detection result obtained by said detecting means, wherein said n lines of image data are smaller in value than said m lines of image data inputted by said input means.

17. The apparatus according to claim 16, wherein said change amounts indicate a ratio of change to image data of a previous line.

18. The apparatus according to claim 17, wherein said output means outputs said n lines of image data which exclude a line providing a minimum value of said change amounts of image data, which is detected by said detecting means, to image data of a previous line.

19. An image processing apparatus, comprising:
input means for inputting image data; and
thinning means for thinning out image data from the input image data in every predetermined area,
wherein said thinning means differentiates a thinning-out location in said every predetermined area.

20. The apparatus according to claim 19, wherein each said predetermined area corresponds to m lines of image data which are referred to in accordance with a reduction ratio of an image.

21. The apparatus according to claim 20, wherein said thinning means thins out image data of a line, which provides a small value of change amounts of image data to image data of a previous line, from said predetermined area consisting of m lines of image data.

22. The apparatus according to claim 21, wherein said change amounts indicate a ratio of change to image data of a previous line.

23. An image processing method, comprising the steps of:
inputting a reduction ratio of an image;
counting the number of liens constituting the image in accordance with the reduction ratio of the image;
obtaining change amounts of image data to the lines on the basis of the count value; and
thinning image data to a minimum value of the change amounts from the image data for which counting is performed in said counting step,
wherein the image is reduced in a sub-scanning direction by the thinning operation.

24. An image processing method, comprising the steps of:
inputting image data; and
processing to reduce a line of data from among m lines of data constituting the image data,
wherein, said processing step, a line of image data which has a minimum value in change amounts with respect to image data corresponding to a previous line out of the m lines of image data, is reduced.

25. An image processing method, comprising the steps of:
referring to m lines of image data in accordance with a reduction of ratio of an image;
detecting change amounts of image data to an image data of a previous line, with respect to each line of said m lines of image data referred to in said referring step; and
thinning out image data of a line which is selected, based upon a detection result obtained in said detecting step, from among the m lines of image data referred to in said referring step,
wherein said thinning step causes said image to be reduced at said reduction ratio.

26. An image processing method, comprising the steps of:
inputting image data;
detecting change amounts of image data to image data of a previous line, with respect to m lines of image data input in said inputting step; and
thinning out image data of a line which is selected, based upon a detection result obtained in said detecting step, from among the m lines of image data input in said inputting step.

27. An image processing method, comprising the steps of:
inputting image data;
detecting change amounts of image data to image data of a previous line, with respect to m lines of image data input in said inputting step; and
outputting n lines of image data based upon a detection result obtained in said detecting step, wherein said n lines of image data are smaller in value than said m lines of image data input in said inputting step.

28. An image processing method, comprising the steps of:
inputting image data; and
thinning out image data from said input image data in every predetermined area,
wherein said thinning step differentiates a thinning-out location in said every predetermined area.

* * * * *

UNITED STATES PATENT AND TRADEMARK OFFICE
CERTIFICATE OF CORRECTION

PATENT NO. : 5,444,549
DATED : August 22, 1995
INVENTOR(S) : Masaya Kondo

It is certified that error appears in the above-indentified patent and that said Letters Patent is hereby corrected as shown below:

COLUMN 1

Line 50, "FIG. 1" should read --FIG. 1 is--.

COLUMN 3

Line 21, "value" should read --value n--.
Line 22, "value E" should read --value n--.

COLUMN 6

Line 9, "liens" should read --lines--.

Signed and Sealed this

Nineteenth Day of December, 1995

Attest:

BRUCE LEHMAN

Attesting Officer

Commissioner of Patents and Trademarks